(12) United States Patent
Shyu et al.

(10) Patent No.: US 6,564,772 B1
(45) Date of Patent: May 20, 2003

(54) INJECTOR TIP FOR AN INTERNAL COMBUSTION ENGINE

(75) Inventors: Tsu Pin Shyu, Dunlap, IL (US); Wen Ye, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/021,356

(22) Filed: Oct. 30, 2001

(51) Int. Cl.⁷ .................................................. F02B 5/00
(52) U.S. Cl. .................... 123/305; 239/533.12; 239/596
(58) Field of Search .............................. 123/305, 301, 123/294; 239/533.12, 596

(56) References Cited

U.S. PATENT DOCUMENTS

| | | |
|---|---|---|
| 20,626 A | 6/1858 | Cornelius |
| 3,126,300 A | 3/1964 | Bienefelt et al. |
| 3,591,907 A | 7/1971 | MacMunn |
| 3,985,301 A | 10/1976 | Tindall |
| 4,657,189 A | 4/1987 | Iwata et al. |
| 4,917,307 A | 4/1990 | Baxter et al. |
| 5,533,482 A | 7/1996 | Naitoh |
| 5,540,200 A | 7/1996 | Naitoh et al. |
| 5,752,659 A | 5/1998 | Moncelle |
| 6,161,780 A * | 12/2000 | Sugimoto et al. ...... 239/533.12 |
| 6,394,367 B2 * | 5/2002 | Munezane et al. ...... 239/533.12 |
| 6,405,946 B1 * | 6/2002 | Harata et al. .......... 239/533.12 |

* cited by examiner

*Primary Examiner*—Bibhu Mohanty
(74) *Attorney, Agent, or Firm*—Tom Derry

(57) ABSTRACT

This invention relates to a the tip structure of a fuel injector as used in a internal combustion engine. Internal combustion engines using Homogeneous Charge Compression Ignition (HCCI) technology require a tip structure that directs fuel spray in a downward direction. This requirement necessitates a tip design that is capable of withstanding mechanical stresses associated with the design.

15 Claims, 4 Drawing Sheets

Fig_1_

INJECTOR TIP FOR AN INTERNAL COMBUSTION ENGINE

This invention was made with Government support under DOE Contract No. DE-FC05-97OR22605 awarded by the U.S. Department of Energy. The Government has certain rights to this invention.

TECHNICAL FIELD

This invention relates generally to an nozzle and more specifically to a nozzle tip for a fuel injector used with the internal combustion engine.

BACKGROUND

Manufacturers of internal combustion engines are continuously attempting to improve on the efficiency and emissions output of internal combustion engines. In diesel engines, a large amount of research has been done to reduce NOx output of an engine, through the use of improved fuel injectors and injection timing. Typically, combustion takes place over approximately 40 to 50 degrees of crankshaft rotation. A nozzle tip for a fuel injector in a typical modern diesel engine includes an end portion, the end portion includes a plurality of nozzle openings. High pressure fuel is forced into the end portion and sprayed into the combustion chamber as the piston nears top dead center. The nozzle openings are oriented to spray fuel at an angle of 60 to 80 degrees from a longitudinal axis of the injector.

Research has revealed that NOx emissions can be greatly reduced at partial load through a Homogeneous Charge Compression Ignition (HCCI). This is accomplished by injecting fuel into the cylinder at a much earlier stage in the combustion cycle. In this case, earlier, refers to the piston being farther from the cylinder head during the compression stroke of the engine, as the piston moves toward the cylinder head. The early injection permits fuel and air to more thoroughly mix, because in part there is a larger area between the top of the piston and the cylinder head. Having fuel and air more thoroughly mixed creates more complete combustion.

Using a conventional injector tip configuration to achieve Homogeneous Charge Compression Ignition operation of an internal combustion engine results in fuel being sprayed in an undesirable pattern causing inadequate mixing. For example fuel may cling to the cylinder walls and other surfaces and not properly mix with air. This is because of the direction of the nozzle openings is toward the cylinder walls and the piston is so far from the fuel injector. By changing the angle of the nozzles in relation to the longitudinal axis, fuel can be directed toward the top surface of the piston. Changing the angle of the nozzle openings creates a new problem, fatigue life of the nozzle cavity at the entrance of the nozzle opening may be reduced using conventional tip geometry.

The present invention is directed to overcoming one or more of the above identified problems.

SUMMARY OF THE INVENTION

In a one aspect of the present invention, a nozzle tip for a fuel injector is provided. The fuel injector includes a longitudinal axis. The nozzle tip includes the end portion having a inner surface and a outer surface. A plurality of nozzle openings are disposed through said end portion and have a central axis. Each of the nozzle openings at an angle between the central axis and longitudinal axis of between 5 and 10 degrees.

DETAILED DESCRIPTION

Figure 1:
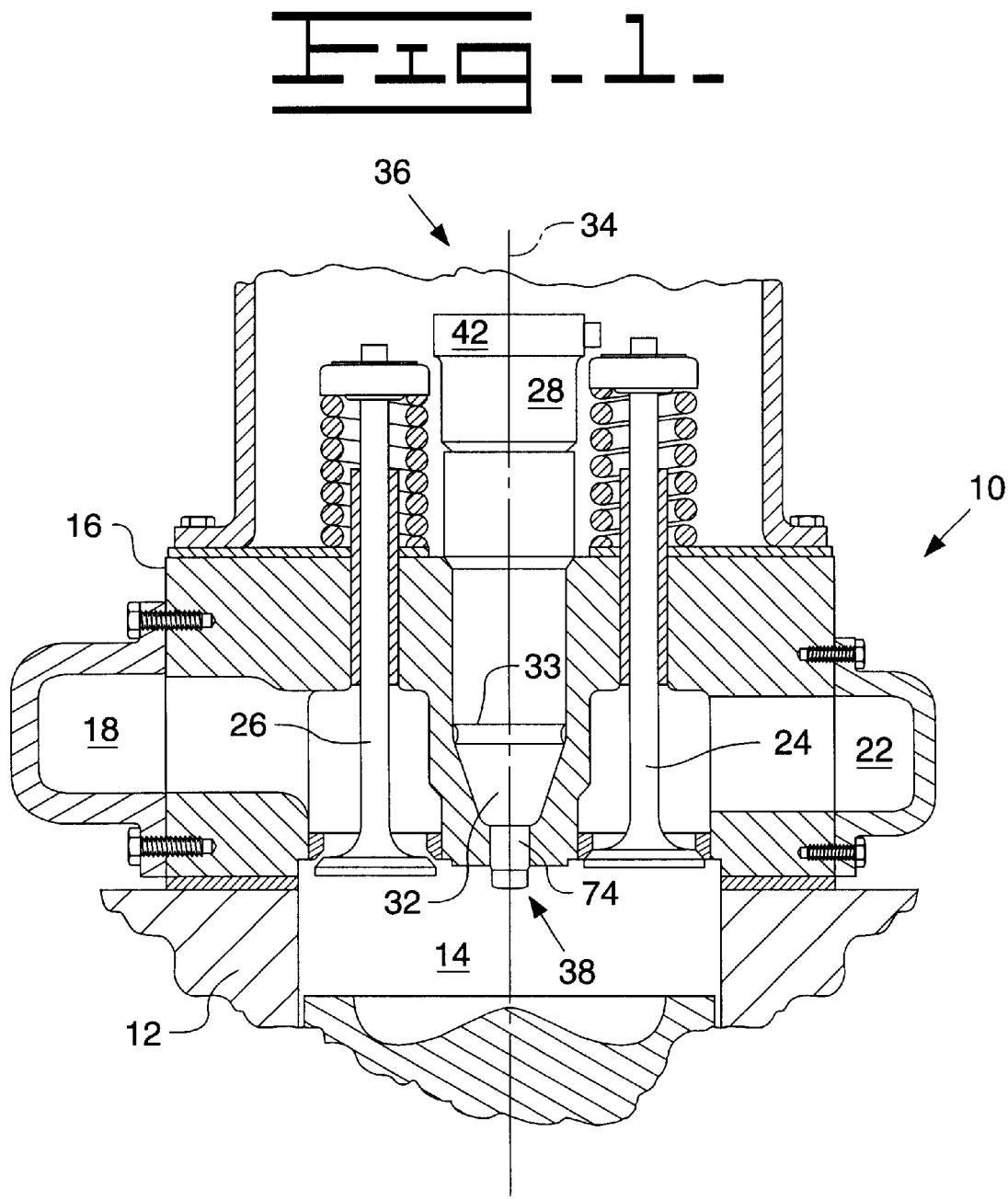
FIG. 1 is a partial sectional illustration of an engine having a fuel injector embodying one aspect of the present invention.

Referring to FIG. 1 an engine 10 includes a block 12 having a plurality of cylinders 14 therein, of which only one is shown, and a cylinder head 16 includes and exhaust passage 18 and an intake passage 22. An intake valve 24 is interposed the intake passage 22 and the cylinder 14. An exhaust valve 26 is interposed the exhaust passage 18 and the cylinder 14. A fuel injector 28 having a body 30, a nozzle assembly 32, and a end portion 33 is additionally positioned within the cylinder head 16. The fuel injector 28 is substantially of conventional construction, such as the type use with a hydraulically actuated electronically controlled unit injector system The fuel injector 28 includes a body 30 having a longitudinal axis 34, an upper end 36 and a lower end 38. An electronically actuated solenoid 42 is removably attached to the upper end 36. A nozzle assembly 44 is removably attached to the lower end 38.

Figure 2:
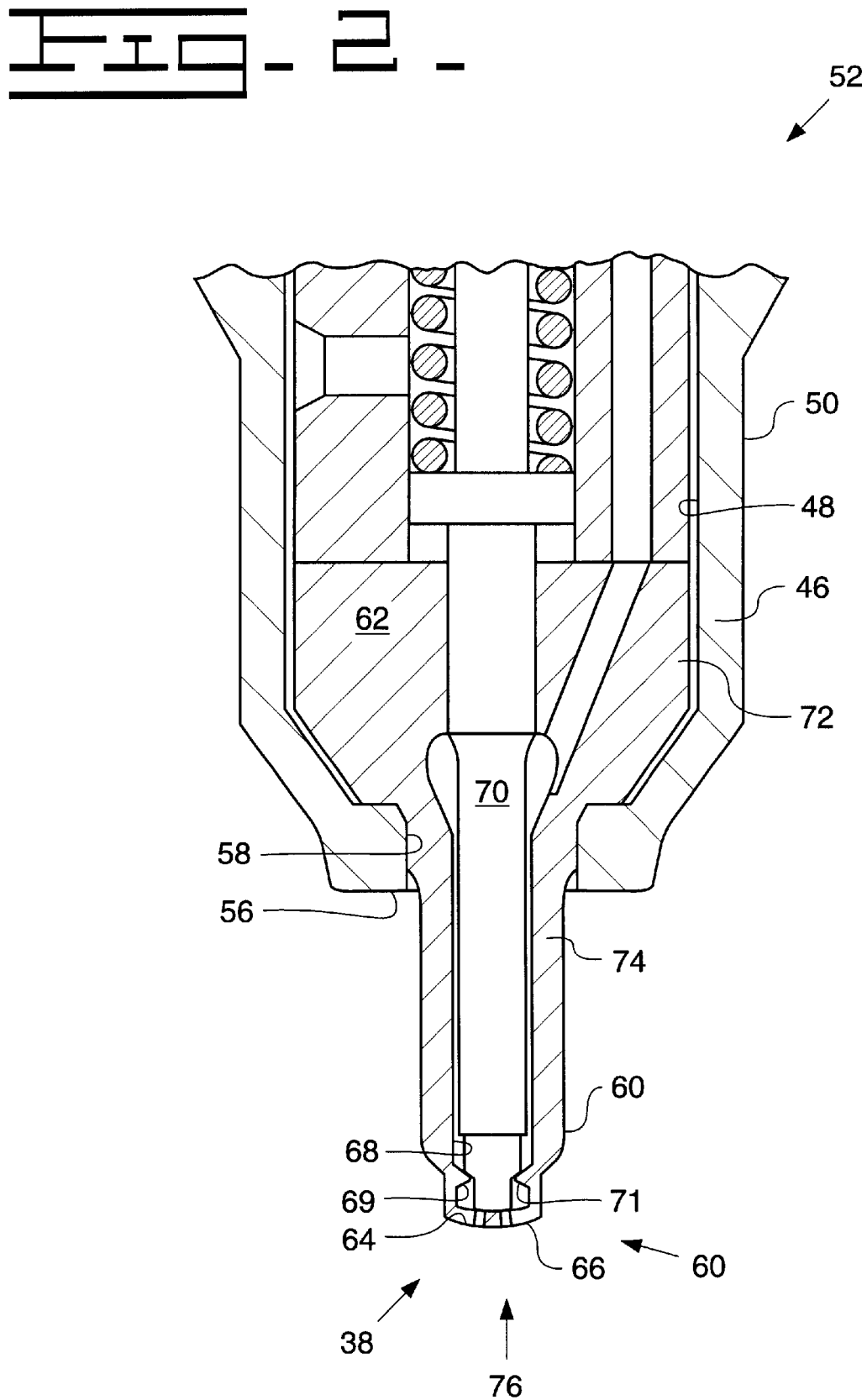
FIG. 2 is an enlarged partial section illustration of the nozzle assembly of FIG. 1.

Referring now to FIG. 2, the nozzle assembly 32 includes an attachment portion 33 and a nozzle tip 60. The attachment portion 33 is a substantially cylindrical member having an inner wall 48, an outer wall 50, a first end 52 and a second end 56. The first end 52 is generally opened and adapted to engage the lower end 38 of the injector body 30. The second end 56 is partially closed and defines an opening 58 that is adapted to receive a nozzle tip 60 in a conventional manner.

The nozzle tip 60 is a substantially cylindrical member having a first end 62, a second end 64, an outer surface 66 and an inner bore 68. The inner bore 68 extends from the first end 62 toward the second end 64. A seat 69 is defined within the inner bore 68, preferably near the second end 64. The inner bore 68 is adapted to receive a needle valve 70. The needle valve 70 is moveable between a first and second position. The needle valve 70 includes a needle seat 71 that is adapted to engage the seat when in the first position. The outer surface 66 defines a shoulder portion 72 toward the first end 62 and a shank portion 74 interposed the shoulder portion 72 and the second end 64. The second end 64 of the nozzle tip 60 includes the end portion 76 having an inner surface 78 and an outer surface 80. A plurality of nozzle openings 86 extend through the end portion 76 and open at the inner surface 78 and the outer surface 80. The nozzle openings 34 may be disposed about the longitudinal axis 34.

Figure 3:
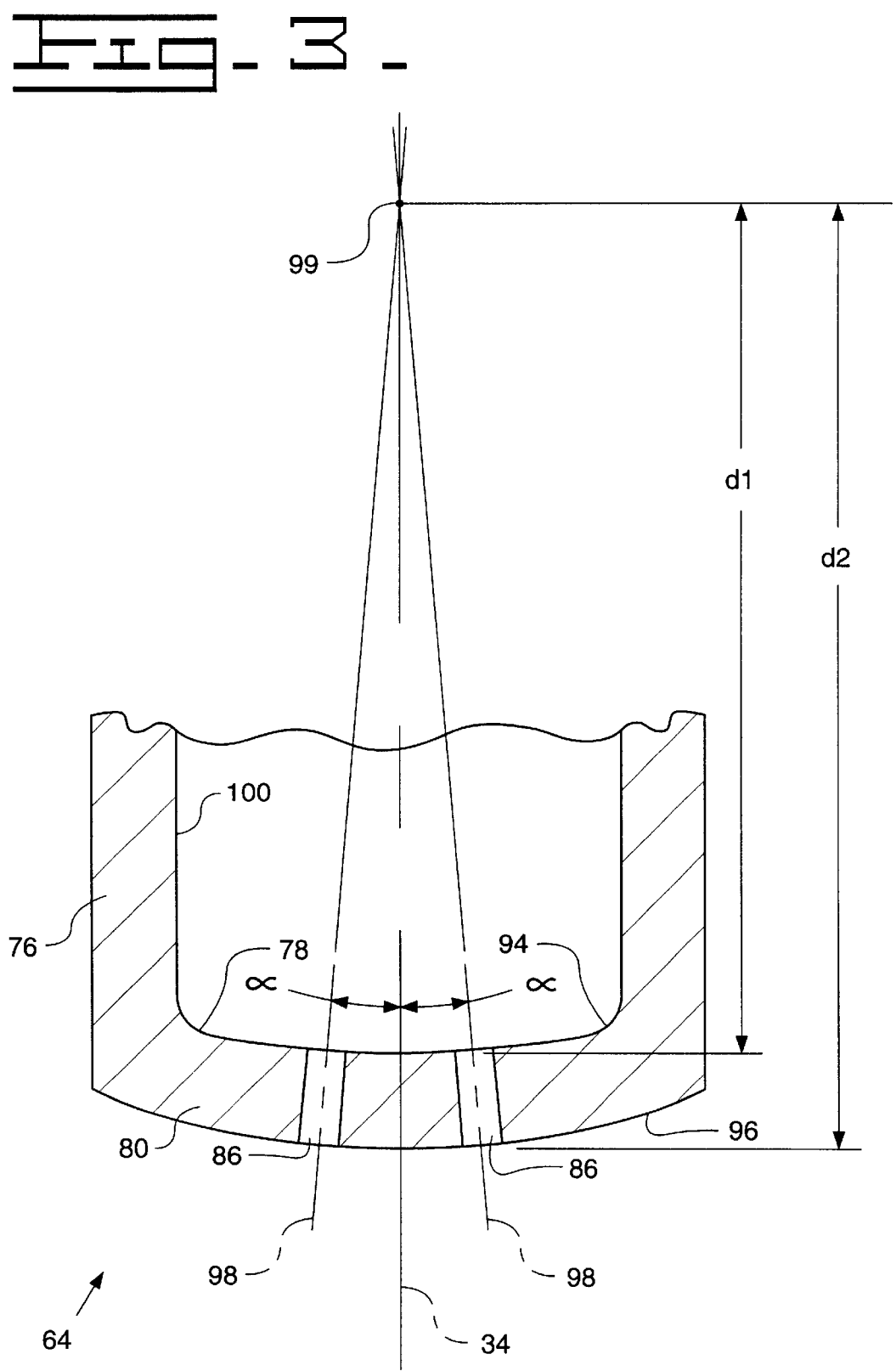
FIG. 3 is an enlarged partial sectional illustration of the nozzle tip of FIG. 2.

Referring to FIG. 3, an embodiment of a end portion 76 of the present invention is shown. The inner surface 78 and outer surface 80 form a cylindrical portion 91 that is defined about the longitudinal axis 34 of the fuel injector 28. The cylindrical portion 91 includes the end portion 76 and joins the inner bore 68 of the nozzle tip 60 opposite the end portion 76. The end portion 76 forms a substantially large radius on the inner surface 78 and the outer surface 80. The inner surface 78 and the outer surface 80 are spaced a predetermined distance from one and other. The nozzle openings 86 may be disposed evenly about longitudinal axis 34. Each nozzle opening 86 includes a central axis 98 and a inside wall 100. An intersection 99 is formed by the longitudinal axis 34 and the central axis 98 of each nozzle opening 90. An angle α is defined between the longitudinal axis 34 and the central axis 98. The angle α is preferably between 5 and 10 degrees. The nozzle openings 86 and each of the inner surface 78 and the outer surface 80 are substantially perpendicular to one and other. A radius 102 may additionally be formed at the intersection of the nozzle opening 86 and the inner surface 78.

Figure 4:
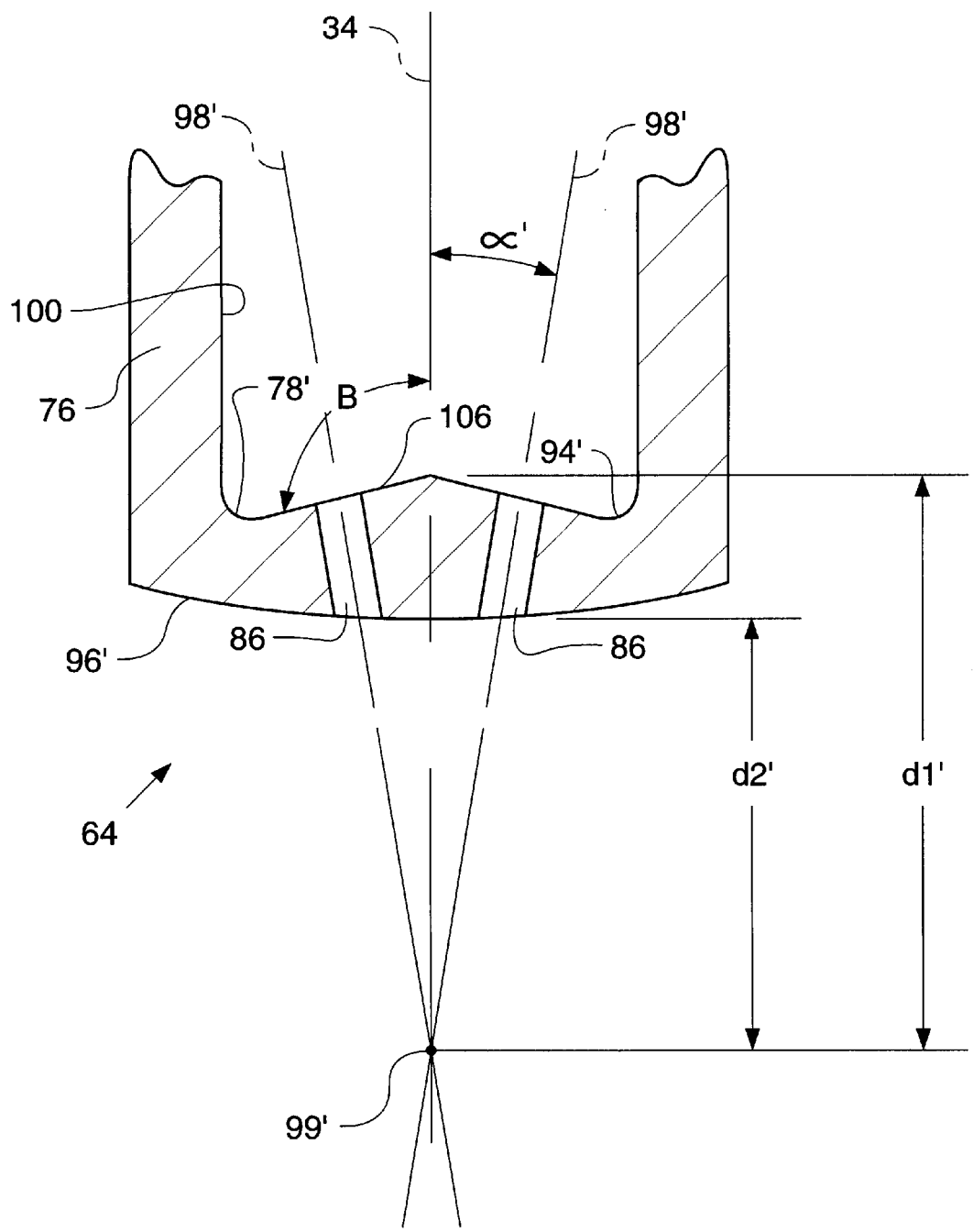
FIG. 4 is an enlarged partial sectional illustration of a nozzle tip embodying another aspect of the present invention.

Referring to FIG. 4, another embodiment of a end portion 76' is shown. The end portion 33' joins the inner bore 68 of the nozzle tip 60 opposite the end portion 76'. The end portion 76' forms a large radius on the outer surface 80'. A conical portion 106 is defined about the longitudinal axis 34 on the inner surface 78'. The nozzle openings 86 are disposed about longitudinal axis 34. Each nozzle opening 86 includes a central axis 98 and a inside wall 100. The central axis 98 of each nozzle opening 86 is substantially perpendicular to the conical portion 106. An intersection 99' is formed by the longitudinal axis 34 and the central axis 98 of each nozzle opening 86. An angle α' is defined between the longitudinal axis 34 and the central axis 98. The angle α' is preferably between 5 and 10 degrees. An angle β is defined between the longitudinal axis 34 and the conical portion 106. Angle β is preferably between 100 and 110 degrees. A radius 102 may additionally be provided at the intersection of the inside wall 100 and the inner surface 86'.

INDUSTRIAL APPLICABILITY

In operation, a fuel injector 28 facilitates HCCI combustion by directing early injection of fuel into the cylinders 14 at a desired angle and pattern. The fuel is sprayed in a substantially downward direction, toward the piston, as the piston is moving toward the cylinder head 16. The early injection allows a more thorough mixing of fuel and air because of a larger mixing area and more time before combustion. The more thoroughly mixed fuel and air mixture facilitates combustion at multiple sites in the cylinder 14 simultaneously resulting in more complete combustion and a reduction in NOx production.

The geometric design of the end portion 92 of and the orientation of the nozzles 90 directs a fuel spray in a substantially downward direction and appropriate pattern, preventing the fuel from clinging to the cylinder walls and promoting mixing of air and fuel. Additionally, the orientation of the nozzles 90 reduces the concentration of stresses in the end portion 76', increasing the fatigue life of the nozzle tip 60.

What is claimed is:

1. A nozzle tip for a fuel injector having longitudinal axis, comprising:
   an end portion having an inner surface and an outer surface, said inner surface being conical; and
   a plurality of nozzle openings disposed through said end portion and opening at said inner and outer surfaces, each of said nozzle openings having a central axis, said central axis of said openings being at an angle of between 5 and 10 degrees with respect to said longitudinal axis.

2. The nozzle tip of claim 1, wherein said inner surface being substantially perpendicular to said central axis of said openings.

3. The nozzle tip of claim 1, wherein said central axes of said nozzle openings and said longitudinal axis of said nozzle tip intersecting at a predetermined first distance (d1) from said inner surface and at a predetermined second distance (d2) from said outer surface, said predetermined first distance (d1) being less than that of said predetermined second distance (d2).

4. The nozzle tip of claim 1, wherein said central axes of said nozzle openings and said longitudinal axis if said nozzle tip intersecting at a predetermined distance (d1') from said inner surface and at a second predetermined distance (d2') from said outer surface, said first predetermined distance (d1') being greater than that of said second predetermined distance (d2').

5. The nozzle tip of claim 1, wherein said inner surface being at a predetermined angle (β) of between 100 degrees and 110 degrees relative to said longitudinal axis.

6. An internal combustion engine having a fuel injector, said fuel injector having a longitudinal axis and a nozzle tip, said nozzle tip comprising:
   an end portion having an inner surface and a outer surface, said inner surface being conical; and
   a plurality of nozzle openings disposed through said end portion and opening at said inner surface and said outer surface, each of said nozzle openings having a central axis, said central axis of said opening being at an angle between 5 and 10 degrees with respect to said longitudinal axis.

7. The internal combustion engine of claim 6, wherein said inner surface of said nozzle tip being substantially perpendicular to said central axis of said openings.

8. The internal combustion engine of claim 6, wherein said central axes of said nozzle openings and said longitudinal axes of said nozzle tip intersecting at a first predetermined distance (d1) from said inner surface and at a second predetermined distance (d2) from said outer surface, said first predetermined distance (d1) being less than that of said second predetermined distance (d2).

9. The internal combustion engine of claim 6, wherein said central axes of said nozzle openings and said longitudinal axis of said nozzle tip intersecting at a first predetermined distance (d1') from said inner surface and at a second predetermined distance (d2') from said outer surface, said first predetermined distance (d1') being less than that of said second predetermined distance (d2').

10. The internal combustion engine of claim 6, wherein said inner surface being at an angle (β) between 100 degrees and 110 degrees relative to said longitudinal axis.

11. A nozzle tip for a fuel injector having longitudinal axis, comprising:
    an end portion having a single chamber including a conical inner surface and an outer surface; and
    a plurality of nozzle openings disposed through said end portion and opening at said inner and outer surfaces, each of said nozzle openings having a central axis, said central axis of said openings being at an angle of between 5 and 10 degrees with respect to said longitudinal axis.

12. The nozzle tip of claim 11, wherein said inner surface being substantially perpendicular to said central axis of said openings.

13. The nozzle tip of claim 11, wherein said central axes of said nozzle openings and said longitudinal axis of said nozzle tip intersecting at a predetermined first distance (d1) from said inner surface and at a predetermined second distance (d2) from said outer surface, said predetermined first distance (d1) being less than that of said predetermined second distance (d2).

14. The nozzle tip of claim 11, wherein said central axes of said nozzle openings and said longitudinal axis if said nozzle tip intersecting at a predetermined distance (d1') from said inner surface and at a second predetermined distance (d2') from said outer surface, said first predetermined distance (d1') being greater than that of said second predetermined distance (d2').

15. The nozzle tip of claim 11, wherein said inner surface being at a predetermined angle (β) of between 100 degrees and 110 degrees relative to said longitudinal axis.

* * * * *